DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 25, 1972

900 O.G. 1232

T900,022
POLYMERIZATION PROCESS

Charles R. Johnson and Warren E. Jones, Akron, Ohio, assignors to The Firestone Tire & Rubber Company, Akron, Ohio

Continuation of application Ser. No. 655,929, July 25, 1967. This application May 13, 1971, Ser. No. 143,170
**Int. Cl. C08f *1/74***
U.S. Cl. 260—80.7
1 Sheet Drawing. 8 Pages Specification

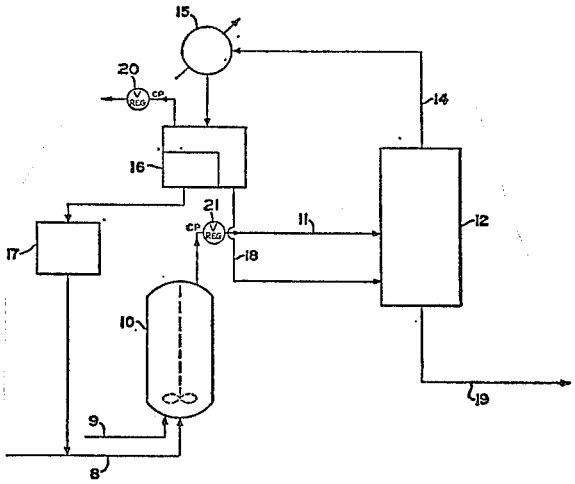

The process of continuous solution of polymerization, in the substantial absence of water, of 1,3-butadiene alone, with either isoprene or styrene, or all three materials together which comprises the steps of continuously introducing this material, a lithium catalyst, 1,2-butadiene as a modifier and an inert solvent such as hexane into at least one reactor wherein the polymerization of the material takes place. Transferring the polymerized material, solvent and unreacted modifier in the substantial absence of water directly to means for vaporizing volatile material whereat an amount of solvent and modifier is vaporized overhead. The amount of solvent and modifier vaporized is enough to increase the concentration of the polymerized material in the solvent at least 5%. The vaporized solvent and modifier is condensed and recycled into the reactor along with the continuous introduction of the monomeric material. The amount of 1,2-butadiene recycled is at least 50% of the unreacted 1,2-butadiene. The polymerized material is removed in the solvent from the vaporizing means.

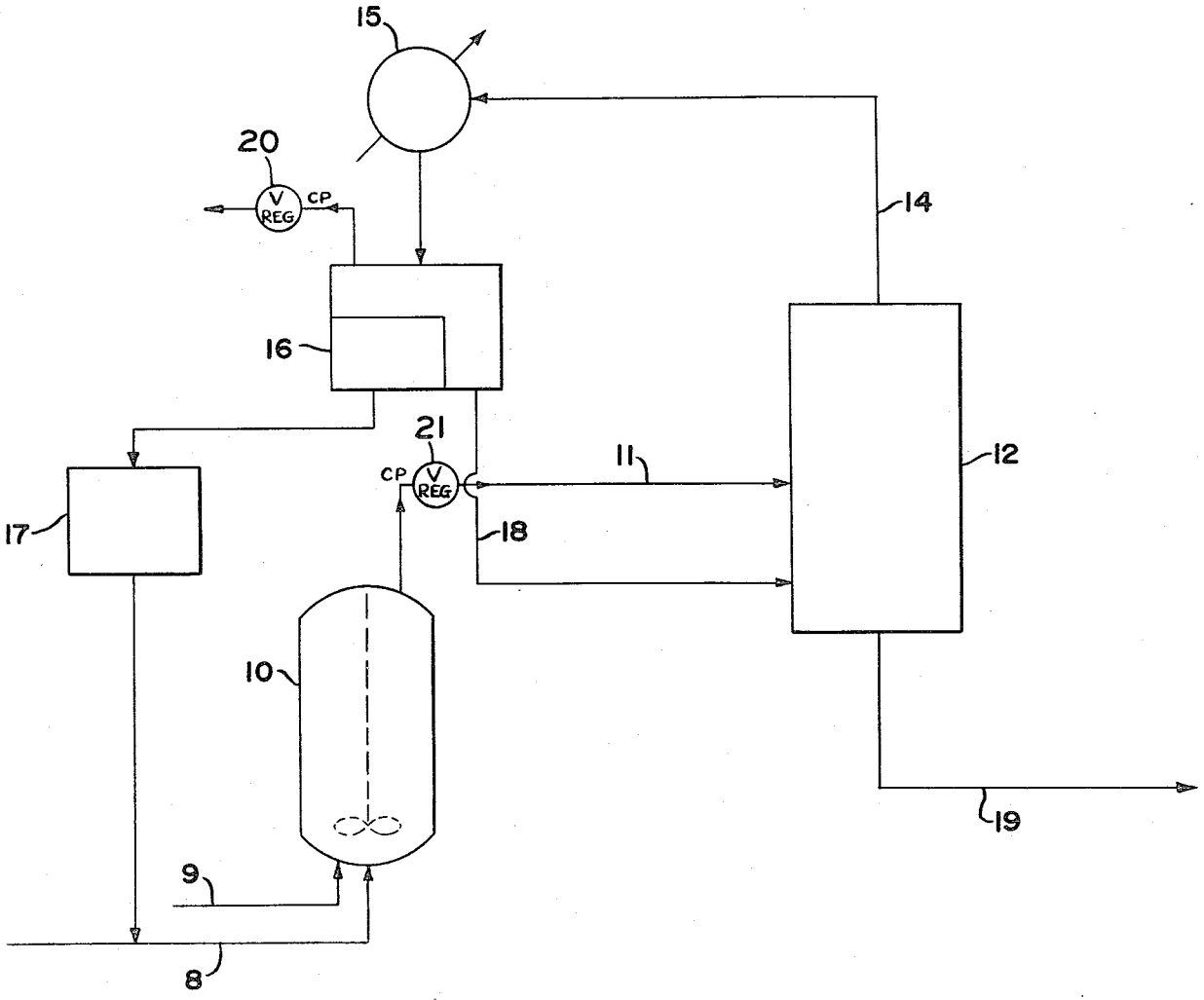

July 25, 1972 C. R. JOHNSON ET AL T900,022
POLYMERIZATION PROCESS
Original Filed July 25, 1967